US010402952B2

United States Patent
Baar et al.

(10) Patent No.: US 10,402,952 B2
(45) Date of Patent: Sep. 3, 2019

(54) PERCEPTUAL TONE MAPPING OF SDR IMAGES FOR AN HDR DISPLAY

(71) Applicant: Apple Inc., Cupertino, CA (US)

(72) Inventors: Teun R. Baar, Cupertino, CA (US); Jiaying Wu, San Jose, CA (US); Nicolas P. Bonnier, Campbell, CA (US); Garrett M. Johnson, San Francisco, CA (US); Paul M. Hubel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 15/667,099

(22) Filed: Aug. 2, 2017

(65) Prior Publication Data

US 2018/0350047 A1     Dec. 6, 2018

Related U.S. Application Data

(60) Provisional application No. 62/514,696, filed on Jun. 2, 2017.

(51) Int. Cl.
    *G06T 5/00*     (2006.01)
    *G06T 5/50*     (2006.01)
    *G06T 5/20*     (2006.01)

(52) U.S. Cl.
    CPC ............ *G06T 5/009* (2013.01); *G06T 5/50* (2013.01); *G06T 5/20* (2013.01); *G06T 2207/10024* (2013.01); *G06T 2207/20028* (2013.01); *G06T 2207/20208* (2013.01)

(58) Field of Classification Search
    CPC .................. G06T 5/009; G06T 2207/20208
    See application file for complete search history.

(56) References Cited

U.S. PATENT DOCUMENTS

| | | | |
|---|---|---|---|
| 9,224,363 | B2 | 12/2015 | Ballestad |
| 9,277,196 | B2 | 3/2016 | Stec |
| 2007/0201560 | A1* | 8/2007 | Segall ............ H04N 19/61 |
| | | | 375/240.24 |
| 2017/0026646 | A1 | 1/2017 | Minoo |
| 2017/0048520 | A1 | 2/2017 | Seifi |
| 2017/0084011 | A1* | 3/2017 | Saxena ............ G06T 5/009 |
| 2017/0103729 | A1* | 4/2017 | Huang ............... G06T 5/20 |

* cited by examiner

*Primary Examiner* — Antonio A Caschera
(74) *Attorney, Agent, or Firm* — Blank Rome LLP (57) ABSTRACT

Systems, methods, and computer readable media to improve the operation of electronic display systems. Techniques for inverse tone mapping operations for selected standard dynamic range (SDR) images are described. The converted images may be presented on high dynamic range (HDR) displays so as to increase a user's viewing experience (through an expanded dynamic range) while preserving the artistic content of the displayed information. Techniques disclosed herein selectively transform SDR images to HDR images by determining if the SDR images were created from HDR images (e.g., through the fusion of multiple SDR images) and if their quality is such as to permit the conversion without introducing unwanted visual artifacts. The proposed techniques apply a sigmoidal inverse tone mapping function configured to provide a perceptual-based tone mapping. Values for the function's tuning parameters may be set based on what may be determined about the original HDR-to-SDR mapping operation.

20 Claims, 6 Drawing Sheets

PERCEPTUAL TONE MAPPING OF SDR IMAGES FOR AN HDR DISPLAY

BACKGROUND

This disclosure relates generally to display systems. More particularly, but not by way of limitation, this disclosure relates to a technique for tone mapping standard dynamic range (SDR) images for enhanced presentation on a high dynamic range (HDR) display element (e.g., for improved user experience).

Images conforming to the sRGB or ITU-R BT.709 standards are said to be SDR images. Both color spaces share the same white point (D65) and RGB chromaticity primaries, but can differ in their gamma value. The gamma response curve for sRGB follows a response curve with a gamma of 2.2 while the gamma value for BT.709 may vary from 2.2 to 2.4. SDR images, in the form of digital files such as (often 8 bit) .jpeg, .mov, or .web content are defined for viewing on SDR displays with typical black levels of around 0.1 cd/m$^2$ (candela-per-meter-squared) and peak brightness levels of around 100 cd/m$^2$, for a reference (dim) viewing environment. There is a current trend towards higher dynamic range displays such as provided by locally dimming backlight and liquid crystal displays (LCDs) and Organic Light Emitting Diode (OLED) displays, each of which can have black levels as low as 0.001 cd/m$^2$ and peak brightness levels beyond 1000 cd/m$^2$. To take advantage of these newer HDR displays, a technique is needed to convert legacy SDR images (including movies, photos and web content) into HDR content in a manner that generates "nice" images. That is, pleasing to a human viewer while preserving the artistic intent present in the original image.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide a method to inverse tone map a standard dynamic range (SDR) image so that it may be properly displayed on a high dynamic range (HDR) display unit. As used herein, the phrase "displayed properly" may be understood to mean displaying an image so that its dynamic range is increased without distorting or damaging (i.e., preserving) the image's artistic content. In one or more embodiments the method includes obtaining an SDR image; determining the SDR image was generated from a first HDR image in a pre-determined manner (e.g., through the fusion of multiple SDR images in a known fashion); determining parameter values for an inverse tone mapping function (global or local) based on the pre-determined manner; applying the inverse tone mapping function to the SDR image to generate a second HDR image; and displaying the second HDR image on a HDR display. In some embodiments, the method includes determining a quality of the SDR image; and adjusting the determined parameter values based on the quality of the SDR image. In other embodiments, if the SDR image's quality is determined to be below a specified threshold, application of the inverse tone mapping function may be aborted. In still other embodiments determining the SDR image was generated from a first HDR image further comprises transforming the SDR image to generate an SDR luminance image and an SDR chrominance image; and applying the inverse tone mapping function (global or local) to the SDR image comprises applying the inverse tone mapping function to the SDR luminance image to generate an HDR luminance image. In one or more embodiments, an inverse tone mapping operation may also be applied to each of the SDR image's chroma channels. In yet other embodiments transforming the SDR image to obtain an SDR luminance image and an SDR chrominance image (having one or more chroma channels) further comprises transforming the SDR luminance image to generate an SDR low-frequency luminance image and an SDR high-frequency luminance image; and applying the inverse tone mapping function to the SDR luminance image comprises applying the inverse tone mapping function to the SDR low-frequency luminance image to generate an HDR low-frequency luminance image. Another embodiment may further comprise combining the HDR low-frequency luminance image and the SDR high-frequency luminance image to generate the HDR luminance image. In yet another embodiment the method may further comprise combining the HDR luminance image and the SDR chrominance image to generate the second HDR image. In at least one embodiment, the SDR chrominance image may be inverse tone mapped prior to being combined with the HDR luminance image. In still another embodiment, transforming the SDR luminance image to generate an SDR low-frequency luminance image and an SDR high-frequency luminance image comprises bilaterally filtering the SDR luminance image to generate the SDR low-frequency luminance image and the SDR high-frequency luminance image. In one or more other embodiments, the various methods described herein may be embodied in computer executable program code and stored in a non-transitory storage device. In yet other embodiments, the method may be implemented in an electronic device having HDR display capability.

DETAILED DESCRIPTION

This disclosure pertains to systems, methods, and computer readable media to improve the operation of electronic display systems. In general, techniques are disclosed for inverse tone mapping operations for selected standard dynamic range (SDR) images so that they may be presented on high dynamic range (HDR) displays so as to increase a user's viewing experience (through an expanded dynamic range) while preserving the artistic content of the displayed information. More particularly, techniques disclosed herein selectively transform SDR images to HDR images by determining if the SDR images were created from HDR images (e.g., through the fusion of multiple SDR images) and if their quality is such as to permit the conversion without introducing unwanted visual artifacts. The proposed techniques apply a sigmoidal inverse tone mapping function configured to provide a perceptual-based tone mapping. Values for the function's tuning parameters may be set based on what can be determined about the original HDR-to-SDR mapping operation. Values for the function's tuning parameters may also be learned in an off-line deep learning stage using a dataset of known HDR-SDR image pairs.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of display systems having the benefit of this disclosure.

With HDR displays becoming more available, a technique is needed to render SDR content to obtain a beneficial HDR user experience. While inverse tone mapping algorithms can help to transform legacy SDR content into HDR content, there does not currently exist a unique way to convert and present SDR legacy content on HDR displays that would uniformly increase the viewing experience (e.g., dynamic range) while preserving the artistic substance of the displayed content. It has been determined that one special class of SDR images for which inverse tone mapping can be made to work well are those SDR images that were previously tone mapped from an original HDR scene. Such images can be obtained, for example, through a bracketed capture where the scene is captured by a sequence of images with varying exposures and fused together.

Figure 1:
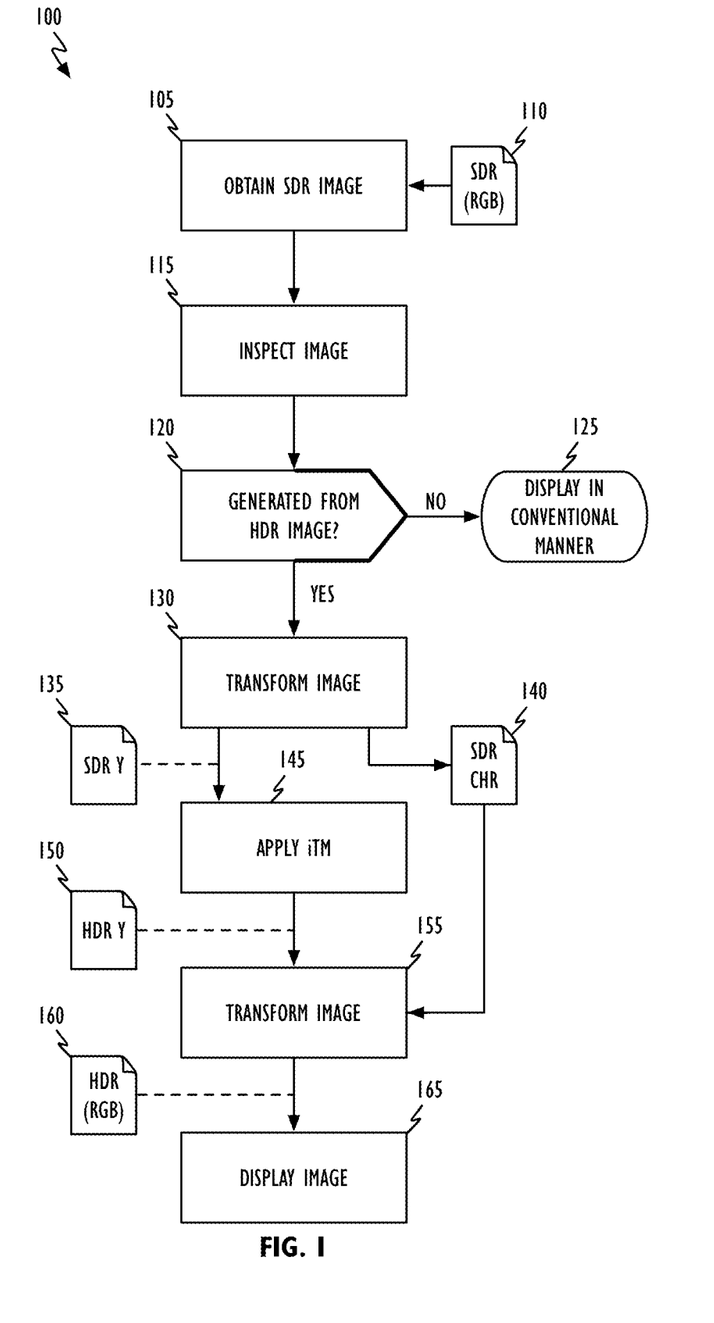
FIG. 1 shows, in flowchart form, image display operations in accordance with one or more embodiments.

Referring to FIG. 1, image display operation 100 in accordance with one or more embodiments begins by obtaining an SDR image (block 105) such as, for example, RGB image 110. Inspection of obtained SDR image 110 (block 115) may be made to determine if SDR image 110 was generated from an HDR image without knowing the transformation used to do so (block 120). In one embodiment the image's metadata may provide an indication of whether SDR image 110 was generated from an HDR source image. In another embodiment, analysis of SDR image 110 itself (i.e., image data) may be used to determine whether it was generated from an HDR source image. By way of example, analysis of a given SDR image's gray levels, noise and (color) banding may be used to determine if the SDR image was generated from and HDR image. In other embodiments, images originating from a particular source may be analyzed to determine the optimal parameters based on user preferences and/or camera behavior. If obtained SDR image 110 was not itself generated from an HDR image (the "NO" prong of block 120), SDR image 110 may be displayed on an HDR display in a conventional manner (block 125). In addition or alternatively, a gentle inverse tone mapping operation may be applied to SDR image 110 prior to it being displayed on an HDR display (in accordance with block 125). In another embodiment, the SDR image's quality may also be taken into account (see FIG. 3). If obtained SDR image 110 is determined to have been generated from an HDR image (the "YES" prong of block 120), SDR image 110's (e.g., linear) RGB values may be transformed (block 130) to yield SDR luminance information 135 (aka SDR luminance image 135) and SDR chrominance information 140 (aka SDR chrominance image 140). Luminance and chrominance information 135 and 140 could, for example, be represented in the CIEL*a*b* color space ("L" represents lightness, "a" represents red/blue chrominance, and "b" represents yellow/blue chrominance), the CIE L*c*h color space ("L" represents lightness, "c" represents chroma or saturation, and "h" represents hue angle), the YCoCg color space ("L" represents luminance (Y), "Co" represents orange chrominance, and "Cg" green chrominance), or the YCbCr color spaces ("Y" represents luminance, "Cb" represents blue-difference chroma, and "Cr" represents red-difference chroma). Once transformed, SDR luminance information 135 may be inverse tone mapped (block 145) in accordance with this disclosure to yield HDR luminance information 150 (aka HDR luminance image 150). In one embodiment, the inverse tone map may be a global inverse tone map. In another embodiment, the inverse tone map may be a local inverse tone map. HDR luminance information 150 and SDR chrominance information 140 may be combined and transformed back into, for example, the RGB color space (block 155) to yield HDR image 160. HDR image 160 may then be displayed on an HDR display unit (block 165).

The applied inverse tone mapping function (e.g. sigmoidal curve) in accordance with this disclosure may be applied in several color spaces SUCH AT sRGB, linear RGB, YCbCr, etc. In an ideal situation, the inverse tone mapping function would only be applied to the luminance channel (block 145) so as to keep the chroma and hue in HDR image 160 perceptually identical to original SDR image 110. For this reason, it may be beneficial to tone map the chroma channels of SDR image 110. In one embodiment, for example, tone mapping operations could be applied in another color space (e.g., RGB) with an inverse tone mapping curve for each color channel depending on SDR image 110. In another embodiment, inverse tone mapping in accordance with block 145 may be applied to the luma or luminance channel and small (inverse tone mapping) corrections could be applied to the chroma and hue channels (e.g., during actions in accordance with block 155). In this latter case, the applied non-luminance channel corrections may be a function of the original luminance (of SDR image 110) and the inverse tone mapped luminance values (of image 150) of each pixel.

Figure 2:
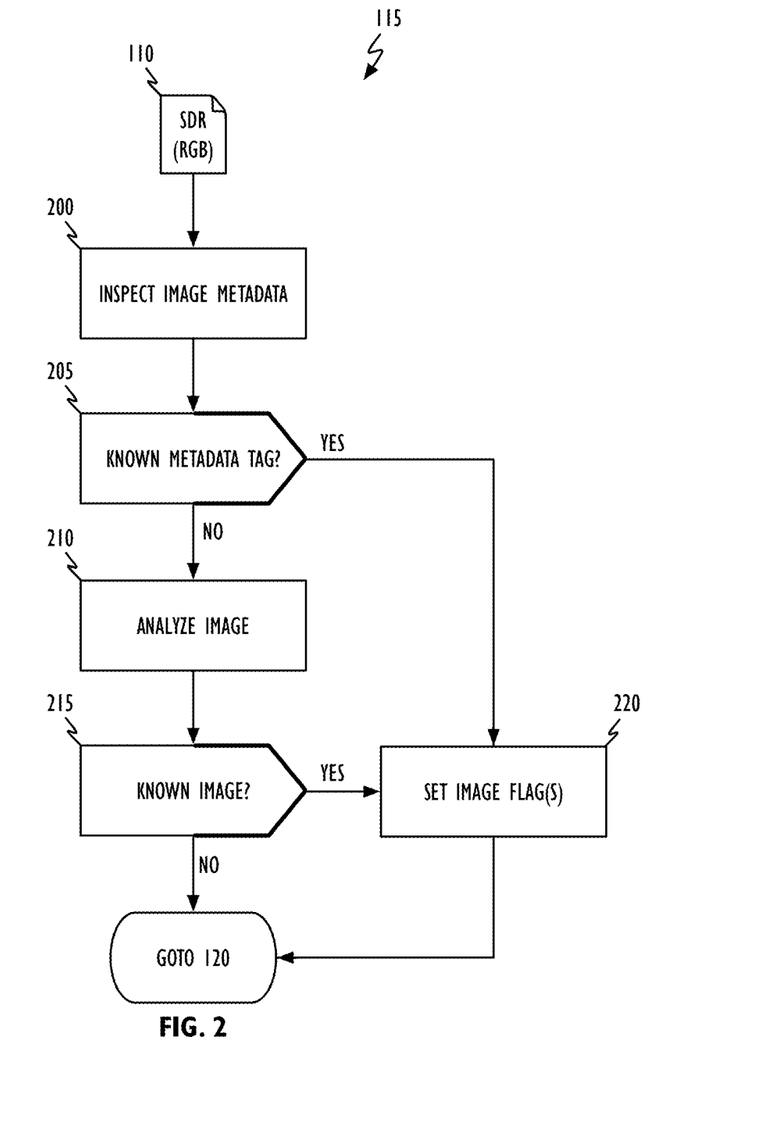
FIG. 2 shows, in flowchart form, image inspection operations in accordance with one or more embodiments.

Referring to FIG. 2, image inspection operation 115 in accordance with one or more embodiments may begin with inspection of SDR image 110's metadata (block 200). By way of example, the metadata could include a tag indicating the image was originally an HDR image and the source of the image. In some embodiments, the "tag" may be a combination of metadata information. It is significant to note that the tone mapping function used to convert SDR image 110 from an HDR image into an SDR image is not provided in the image's metadata. If the metadata fails to indicate the image was previously an HDR image (the "NO" prong of block 205), the image data itself may be analyzed (block 210). For example, image statistics such as (local) histograms might be used to deduce this information. If analysis is unable to determine whether SDR image 110 was originally an HDR image (the "NO" prong of block 215), SDR image 110 may be tagged as "unknown" where after processing continues at block 120. The term "unknown" as used here simply means it cannot be determined whether SDR image 110 was previously an HDR image or it is unknown how to apply the inverse tone mapping function in accordance with block 145 to generate an image that would enhance a user's viewing experience while preserving the artistic content of the displayed information. If SDR image 110's metadata indicates it was previously an HDR image (the "YES" prong of block 205) or analysis of SDR image 110's data indicates it was previously an HDR image (the "YES" prong of block 215), a flag or other information associated with SDR image 110 may be set so as to indicate that it was previously and HDR image (block 220). The flag (or flags) may also indicate the imaging system that generated SDR image 110 (e.g., the type of camera).

Figure 3:
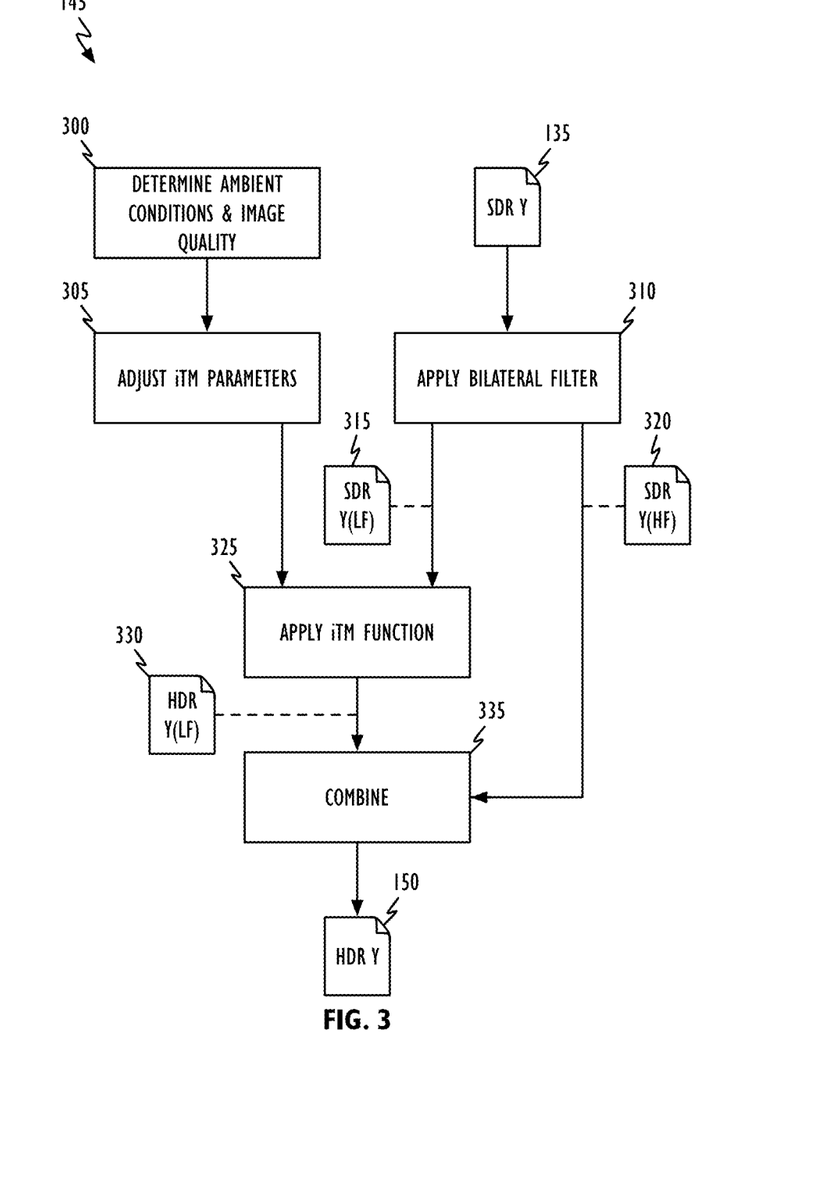
FIG. 3 shows, in flowchart form, inverse tone mapping operations in accordance with one or more embodiments.

Referring to FIG. 3, inverse tone mapping operation 145 in accordance with one or more embodiments determines the HDR display's ambient conditions and a quality measure of SDR image 110. A quality metric or measure may be obtained using a combination of global and local image statistics. For example, a measure of the noise present in the image and/or statistics from (local) image histograms may be used. This may be done in both the luminance and chroma channels, although the former may be more important as luminance may be boosted more in accordance with this disclosure. Ambient conditions can include, by way of example, ambient light levels (e.g., brightness) and the amount of glare on the display. This information may be obtained through sensors such as light meters. Image quality information may be obtained from image metadata and/or analysis of the image data itself (during actions associated with blocks 200 or 210). In one embodiment, highlights in a poor quality image may be boosted less than that of a comparable good or high quality image to avoid quantization and banding artifacts. In another embodiment, if the quality of an image is determined to be to low (i.e., below a specified threshold), inverse tone mapping in accordance with this disclosure may be aborted. If aborted SDR image 110 may be displayed, for example, in accordance with block 125 Based on the results of actions in accordance with block 300, tuning parameter values of the selected inverse tone mapping (iTM) function may be set or adjusted (block 305). Before, concurrently or after actions in accordance with blocks 300 and 305, SDR luminance information 135 may be filtered (block 310) to generate SDR low frequency luminance information 315 (aka SDR low frequency luminance image 315) and SDR high frequency luminance information 320 (aka SDR high frequency luminance image 320). One example filter operation is a bilateral filter operation. In the illustrated embodiment, SDR low frequency luminance information 315 is inverse tone mapped (block 325) to generate HDR low frequency luminance information 330 which may then be combined with SDR high frequency luminance information 320 (block 335) to produce HDR luminance information 150. Actions in accordance with block 335 may also apply correcting inverse tone mapping operations to the chroma channels as discussed above. Returning to block 325 (and 145), a general embodiment of an inverse tone mapping function in accordance with this disclosure may take the following form:

$$Y' = \frac{C_1 Y + C_2}{C_3 Y + C_4}, \qquad \text{EQ. 1}$$

where Y' represents the selected inverse tone mapping function value, Y represents the SDR image's luminance (e.g., SDR low frequency luminance information 315), and $c_1$, $c_2$, $c_3$ and $c_4$ may be thought of as tuning parameters and depend on the SDR image's low frequency luminance information's black level, reference white and specular white values, and strength of the inverse tone mapping function used.

Figure 4A:
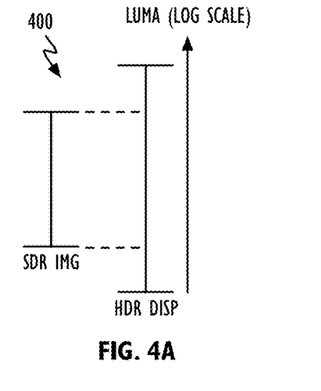
FIGS. 4A-4D illustrate various inverse tone mapping approaches in accordance with one or more embodiments.
Figure 4B:
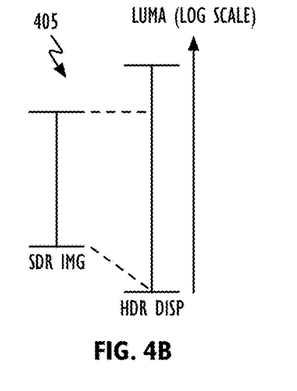
Figure 4C:
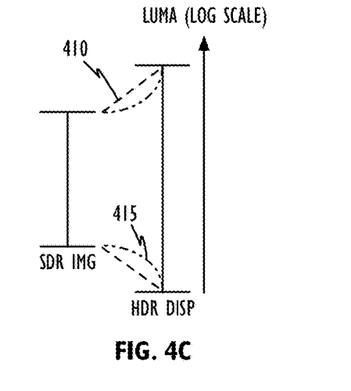
Figure 4D:
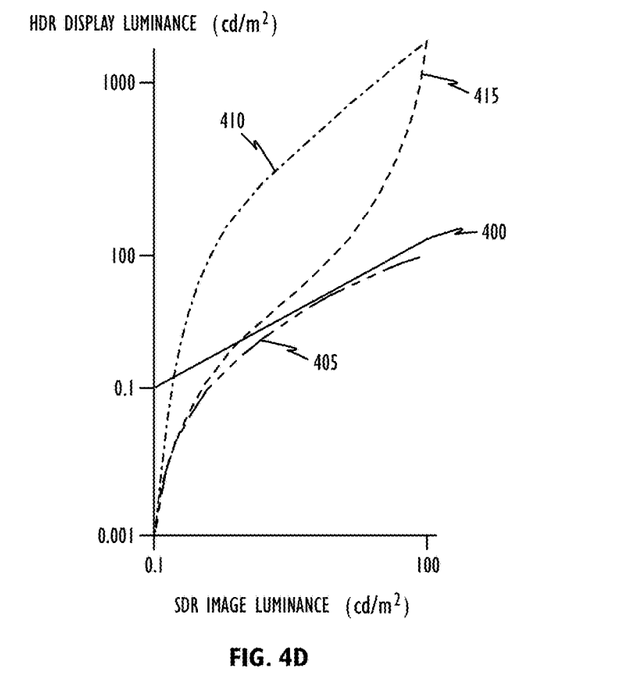

Referring to FIGS. 4A-4D, tone mapping strategies include maintaining reference luminance levels ("absolute" mapping) 400, linear stretching to the HDR display's black point so as to maintain a maximum reference luminance 405, linear stretching to the HDR display's white and black points 410, and "perceptual" stretching to the HDR display's black and white points 415, and other less conservative approaches such as local tone mapping (not shown). FIGS. 4A-4C show these different approaches in log scale. FIG. 4D shows these different approaches in semi-log form.

In one particular embodiment, a perceptual tone mapping approach may be adopted as follows:

$$Y' = \frac{Y_{MIN} + Y_{MAX}(Y_{SDR})^n}{\alpha + \rho(\alpha, n)(Y_{SDR})^n}, \qquad \text{EQ. 2}$$

where $Y_{MIN}$ represents the minimum level of black to where SDR Y(LF) 315 equals 0 would be mapped (generally depends on display black level and viewing conditions), $Y_{MAX}$ represents the maximum level of white to where SDR Y(LF) 315 equals 1 would be mapped (generally depends on display peak brightness, viewing conditions, and SDR image quality), a determines how much the SDR image's mid-tones are boosted, n determines how much the SDR image's highlights are boosted (both generally depend on viewing conditions and image properties such as the histogram and image key of, for example, either element 135 or 315, and $\rho(\alpha, n)$ is a function that may be used to restrict output from EQ. 2 to between 0 and 1. A comparison of EQS. 1 and 2 shows that: $Y_{MAX} \rightarrow c_1$; $Y_{MIN} \rightarrow c_2$; $(Y_{SDR})$ $n \rightarrow Y$; $\rho(\alpha,n) \rightarrow c_3$; and $\alpha \rightarrow c_4$. In general, perceptual tone mapping approaches are characterized by a sigmoid-shaped function (e.g., see curve 415 in FIG. 4D) that tends to "crush" highlights and darks, while maintaining mid-tones.

Figure 5:
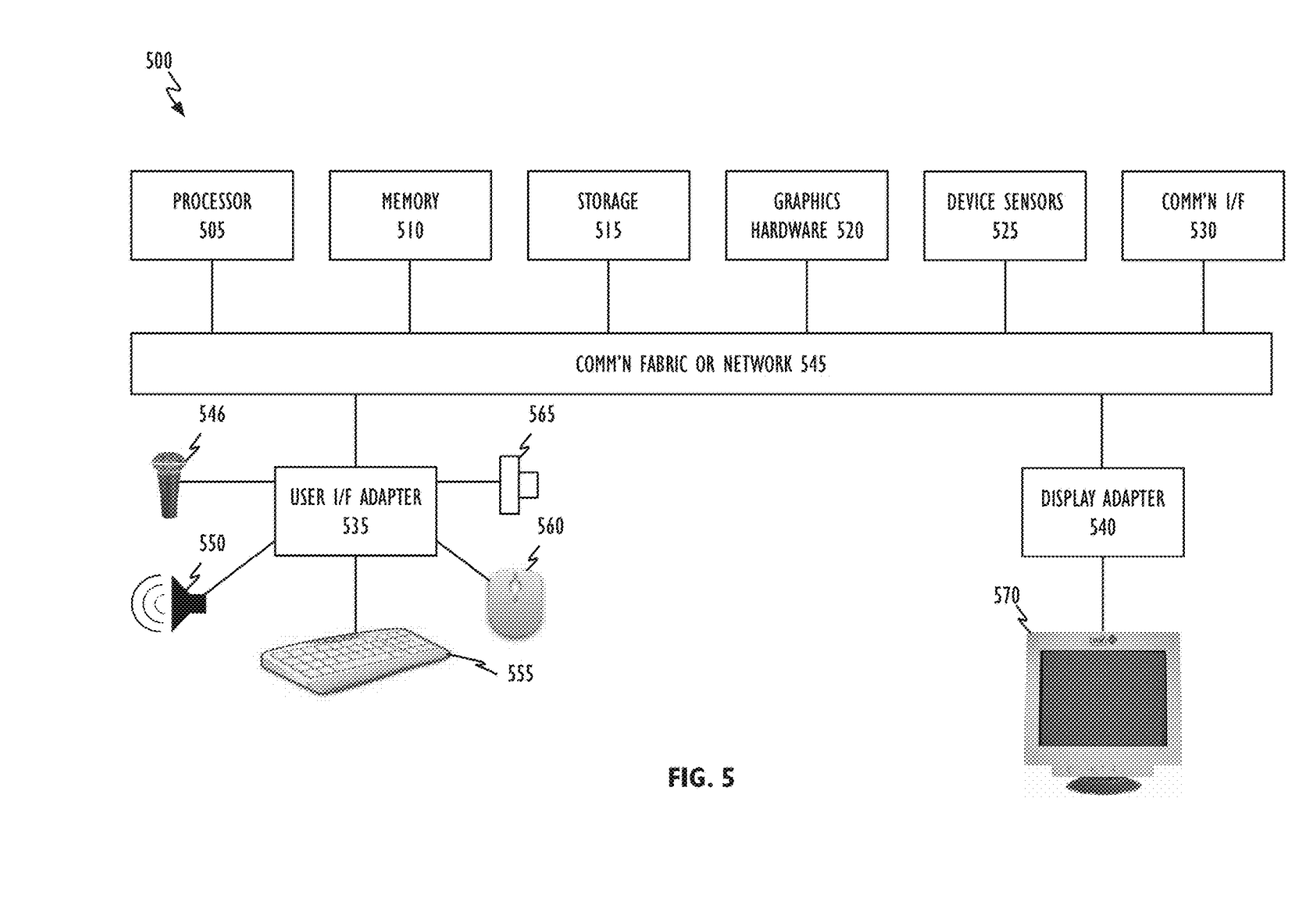
FIG. 5 shows, in block diagram form, a computer system in accordance with one or more embodiments.

Referring to FIG. 5, the disclosed inverse tone mapping operations may be performed by representative computer system 500 (e.g., a general purpose computer system such as a desktop, laptop, notebook or tablet computer system). Computer system 500 may include processor element or module 505, memory 510, one or more storage devices 515, graphics hardware element or module 520, device sensors 525, communication interface module or circuit 530, user interface adapter 535 and display adapter 540—all of which may be coupled via system bus, backplane, fabric or network 545 which may be comprised of one or more switches or one or more continuous (as shown) or discontinuous communication links. Processor module 505 may include one or more processing units each of which may include at least one central processing unit (CPU) and zero or more graphics processing units (GPUs); each of which in turn may include one or more processing cores. Each processing unit may be based on reduced instruction-set computer (RISC) or complex instruction-set computer (CISC) architectures or any other suitable architecture. Processor module 505 may be a single processor element, a system-on-chip, an encapsulated collection of integrated circuits (ICs), or a collection of ICs affixed to one or more substrates. Memory 510 may include one or more different types of media (typically solid-state) used by processor module 505 and graphics hardware 520. For example, memory 510 may include memory cache, read-only memory (ROM), and/or random access memory (RAM). Storage 515 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 510 and storage 515 may be used to retain media (e.g., audio, image and video files), preference information, device profile information, computer program instructions or code organized into one or more modules and written in any desired computer programming language, and any other suitable data. When executed by processor module 505 and/or graphics hardware 520 such computer program code may implement one or more of the methods described herein. Graphics hardware 520 may be special purpose computational hardware for processing graphics and/or assisting processor module 505 perform computational tasks. In one embodiment, graphics hardware 520 may include one or more GPUs, and/or one or more programmable GPUs and each such unit may include one or more processing cores. In another embodiment, graphics hardware 520 may include one or more custom designed graphics engines or pipelines. Such engines or pipelines may be driven, at least in part, through software or firmware. Device sensors 525 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Communication interface 530 may be used to connect computer system 500 to one or more networks or other devices. Illustrative networks include, but are not limited to, a local network such as a USB network, an organization's local area network, and a wide area network such as the Internet. Communication interface 530 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 535 may be used to connect microphone 546, speaker 550, keyboard 555, pointer device 560, and other user interface devices such as image capture device 565 or a touch-pad (not shown). Display adapter 540 may be used to connect one or more display units 570 which may provide touch input capability.

Figure 6:
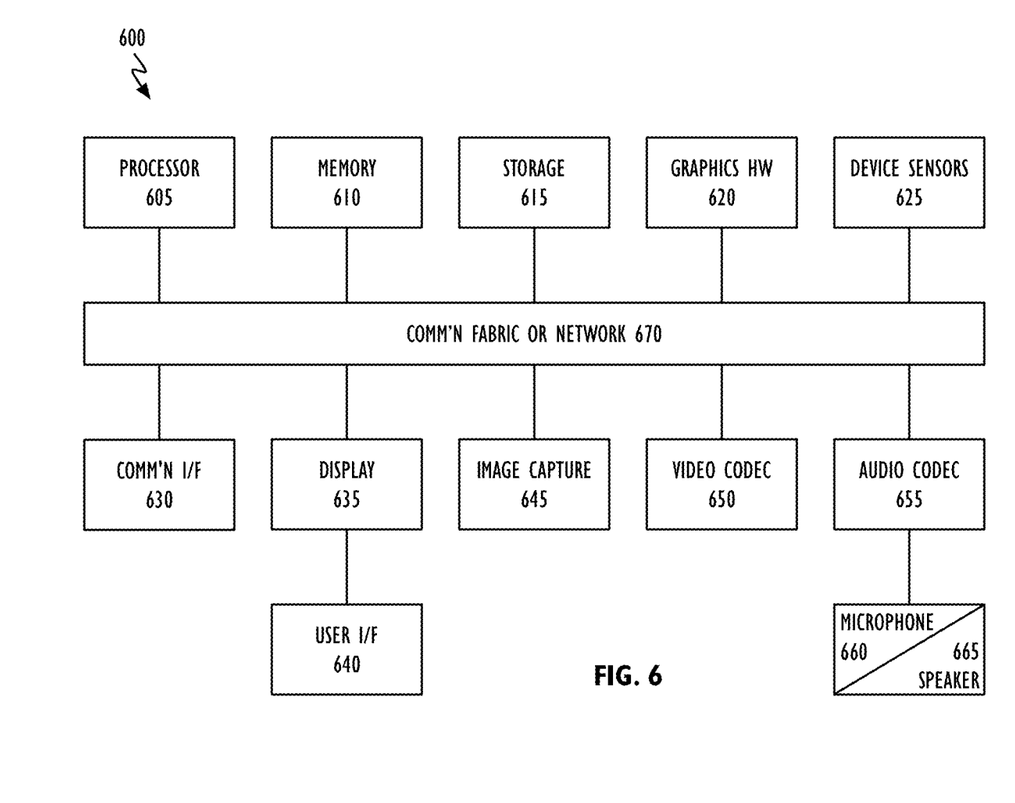
FIG. 6 shows, in block diagram form, a multi-function electronic device in accordance with one or more embodiments.

Referring to FIG. 6, a simplified functional block diagram of illustrative mobile electronic device 600 is shown according to one or more embodiments. Electronic device 600 could be, for example, a mobile telephone, personal media device, a notebook computer system, or a tablet computer system; all of which could be configured to perform inverse tone mapping operations in accordance with this disclosure. As shown, electronic device 600 may include processor element or module 605, memory 610, one or more storage devices 615, graphics hardware 620, device sensors 625, communication interface 630, display element 635 and associated user interface 640 (e.g., for touch surface capability), image capture circuit or unit 645, one or more video codecs 650, one or more audio codecs 655, microphone 660 and one or more speakers 665—all of which may be coupled via system bus, backplane, fabric or network 670 which may be comprised of one or more switches or continuous (as shown) or discontinuous communication links. Processor module 605, memory 610, storage devices 615, graphics hardware 620, device sensors 625, communication interface 630, display element 635 and associated user interface 640 may be of the same or similar type and serve the same function as the similarly named component described above with respect to FIG. 5. Image capture circuit or module 645 may capture still and video images. Output from image capture unit 645 may be processed, at least in part, by video codec 650 and/or processor module 605 and/or graphics hardware 620, and/or a dedicated image processing unit incorporated within image capture unit 645. Images so captured may be stored in memory 610 and/or storage 615. Audio signals obtained via microphone 660 may be, at least partially, processed by audio codec 655. Data so captured may be stored in memory 610 and/or storage 615 and/or output through speakers 665.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1-3 or the arrangement of elements shown in FIGS. 5 and 6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to transform a standard dynamic range (SDR) image into a high dynamic range (HDR) image, comprising:
   receiving an SDR image;
   determining the SDR image was generated from a first HDR image without knowledge of the specific transformation used to do so, wherein determining the SDR image was generated from a first HDR image further comprises transforming the SDR image to generate an SDR luminance image and one or more SDR chrominance images;
   determining parameter values for a first inverse tone mapping function based on analysis of the SDR image;
   applying the first inverse tone mapping function to the SDR image to generate a second HDR image; and
   displaying the second HDR image on a HDR display.

2. The method of claim 1, wherein determining parameter values for a first inverse tone mapping function comprises determining parameter values for a first global inverse tone mapping function.

3. The method of claim 1, further comprises:
   determining a quality metric of the SDR image; and
   adjusting the parameter values based on the quality metric of the SDR image.

4. The method of claim 3, wherein adjusting the parameter values based on the quality metric of the SDR image comprises aborting application of the first inverse tone mapping function when the quality metric is less than a specified threshold.

5. The method of claim 1, wherein applying the first inverse tone mapping function to the SDR image comprises applying the first inverse tone mapping function to the SDR luminance image to generate an HDR luminance image.

6. The method of claim 1, wherein transforming the SDR image to obtain an SDR luminance image and one or more SDR chrominance images further comprises transforming the SDR luminance image to generate an SDR low-frequency luminance image and an SDR high-frequency luminance image.

7. The method of claim 6, wherein applying the first inverse tone mapping function to the SDR image comprises applying the first inverse tone mapping function to the SDR low-frequency luminance image to generate an HDR low-frequency luminance image.

8. The method of claim 7, further comprising combining the HDR low-frequency luminance image and the SDR high-frequency luminance image to generate the HDR luminance image.

9. The method of claim 8, further comprising applying a second inverse tone mapping function to one of the one or more SDR chrominance images to generate a HDR chrominance image.

10. The method of claim 9, further comprising combining the HDR luminance image and the HDR chrominance image to generate the second HDR image.

11. The method of claim 6, wherein transforming the SDR luminance image to generate an SDR low-frequency luminance image and an SDR high-frequency luminance image comprises bilaterally filtering the SDR luminance image to generate the SDR low-frequency luminance image and the SDR high-frequency luminance image.

12. A non-transitory program storage device comprising instructions stored thereon to cause one or more processors to:
   receive a standard dynamic range (SDR) image;
   determine the SDR image was generated from a first high dynamic range (HDR) image without knowledge of the specific transformation used to do so, wherein the instructions to determine the SDR image was generated from a first HDR image further comprise instructions to cause the one or more processors to transform the SDR image to generate an SDR luminance image and one or more SDR chrominance images;
   determine parameter values for a first inverse tone mapping function based on analysis of the SDR image;
   apply the first inverse tone mapping function to the SDR image to generate a second HDR image; and
   display the second HDR image on a HDR display.

13. The non-transitory program storage device of claim 12, wherein the instructions to transform the SDR image to obtain an SDR luminance image further comprise instructions to transform the SDR luminance image to generate an SDR low-frequency luminance image and an SDR high-frequency luminance image.

14. The non-transitory program storage device of claim 13, wherein the instructions to apply the first inverse tone mapping function to the SDR image comprise instructions to apply the first inverse tone mapping function to the SDR low-frequency luminance image to generate an HDR low-frequency luminance image.

15. The non-transitory program storage device of claim 14, further comprising instructions to combine the HDR low-frequency luminance image and the SDR high-frequency luminance image to generate the HDR luminance image.

16. The non-transitory program storage device of claim 15, further comprising instructions to apply second inverse tone mapping functions to the one or more SDR chrominance images to generate one or more HDR chrominance images.

17. The non-transitory program storage device of claim 15, further comprising instructions to combine the HDR luminance image and each of the one or more HDR chrominance images to generate the second HDR image.

18. A system, comprising:
   a memory;
   a display element operatively coupled to the memory; and
   one or more processors operatively coupled to the memory and the display element, the one or more processors configured to execute instructions stored in the memory, the instructions configured to cause the system to—
   retrieve a standard dynamic range (SDR) image from the memory,
   determine the SDR image was generated from a first high dynamic range (HDR) image without knowledge of the specific transformation used to do so,
   transform the SDR image to generate an SDR luminance image and one or more SDR chrominance images,
   determine parameter values for a first inverse tone mapping function based on analysis of the SDR image,
   apply the first inverse tone mapping function to the SDR luminance image to generate a HDR luminance image,
   apply second inverse tone mapping functions to the one or more SDR chrominance images to generate one or more HDR chrominance images, combine the HDR luminance image and each of the one or more HDR chrominance images to generate a second HDR image, and display the second HDR image on the display element.

19. The system of claim 18, wherein the instructions to transform the SDR image to obtain an SDR luminance image further comprise instructions to transform the SDR luminance image to generate an SDR low-frequency luminance image and an SDR high-frequency luminance image.

20. The system of claim 19, wherein the instructions to apply the first inverse tone mapping function to the SDR luminance image comprise instructions to apply the first inverse tone mapping function to the SDR low-frequency luminance image to generate an HDR low-frequency luminance image.

* * * * *